US008521164B2

(12) United States Patent
Kwack et al.

(10) Patent No.: US 8,521,164 B2
(45) Date of Patent: Aug. 27, 2013

(54) APPARATUS AND METHOD FOR ALLOWING FEMTO BASE STATION TO EFFICIENTLY PERFORM BEACONING IN WIRELESS COMMUNICATION SYSTEM

(75) Inventors: Hyun-Sun Kwack, Yongin-si (KR); Young-Sung Kho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 155 days.

(21) Appl. No.: 13/044,798

(22) Filed: Mar. 10, 2011

(65) Prior Publication Data
US 2011/0223915 A1    Sep. 15, 2011

(30) Foreign Application Priority Data

Mar. 11, 2010    (KR) .................. 10-2010-0021662

(51) Int. Cl.
*H04W 36/00*    (2009.01)
*H04W 4/00*    (2009.01)

(52) U.S. Cl.
USPC .................... 455/436; 455/426.1; 455/552.1

(58) Field of Classification Search
USPC ............... 455/436–444, 412.1, 426.1, 552.1, 455/553.1, 458; 370/328, 338
See application file for complete search history.

(56) References Cited

U.S. PATENT DOCUMENTS

| | | | |
|---|---|---|---|
| 6,628,946 B1 * | 9/2003 | Wiberg et al. ................. 455/434 |
| 2002/0141331 A1 * | 10/2002 | Mate et al. ..................... 370/218 |
| 2003/0061557 A1 * | 3/2003 | Chao et al. ..................... 714/748 |
| 2005/0026597 A1 * | 2/2005 | Kim et al. .................. 455/412.1 |
| 2005/0164719 A1 * | 7/2005 | Waters .......................... 455/458 |
| 2010/0022250 A1 * | 1/2010 | Petrovic et al. ............... 455/450 |
| 2010/0075625 A1 * | 3/2010 | Wu ............................ 455/404.1 |
| 2010/0227611 A1 * | 9/2010 | Schmidt et al. ................ 455/434 |
| 2010/0278132 A1 * | 11/2010 | Palanki et al. ................. 370/329 |
| 2010/0323633 A1 * | 12/2010 | Pani et al. ................... 455/67.14 |
| 2011/0019582 A1 * | 1/2011 | Okmyanskiy et al. ........ 370/254 |
| 2011/0081915 A1 * | 4/2011 | Maida et al. .................. 455/450 |
| 2011/0141971 A1 * | 6/2011 | Zhang et al. .................. 370/328 |
| 2011/0171929 A1 * | 7/2011 | Tamura et al. ............. 455/404.1 |

* cited by examiner

*Primary Examiner* — Sam Bhattacharya
*Assistant Examiner* — Daniel Lai
(74) *Attorney, Agent, or Firm* — Jefferson IP Law, LLP (57) ABSTRACT

An apparatus and a method for allowing a femto base station to efficiently perform beaconing in a wireless communication system are provided. The method includes obtaining a System Information Block (SIB) message of a neighbor macro base station transmitted to a terminal by the neighbor macro base station. Information of the femto base station is added to the obtained SIB message of the macro base station and the SIB message is updated. The updated SIB message is transmitted to the terminal.

14 Claims, 6 Drawing Sheets

APPARATUS AND METHOD FOR ALLOWING FEMTO BASE STATION TO EFFICIENTLY PERFORM BEACONING IN WIRELESS COMMUNICATION SYSTEM

PRIORITY

This application claims the benefit under 35 U.S.C. §119(a) of a Korean patent application filed in the Korean Intellectual Property Office on Mar. 11, 2010 and assigned Serial No. 10-2010-0021662, the entire disclosure of which is hereby incorporated by reference.

BACKGROUND OF THE INVENTION

1. Field of the Invention

The present invention relates to an apparatus and a method for allowing a femto base station to efficiently perform beaconing in a wireless communication system. More particularly, the present invention relates to an apparatus and a method for allowing a terminal that has accessed a Long Term Evolution (LTE) macro base station to efficiently perform a hand-in to an LTE femto base station in a case where the terminal moves to a region of the LTE femto base station while conforming to the LTE standard in a wireless communication system.

2. Description of the Related Art

In a cellular wireless communication system, a phenomenon occurs where a channel state is deteriorated due to a geographical condition inside a cell, a distance between a terminal and a base station, or movement of a terminal, and thus communication between the terminal and the base station may not be performed reliably. For example, a shadow area is formed due to a closed building, such as an office and a house, even inside the coverage area of a base station. If a terminal is located in the shadow area, a base station may not reliably perform communication because a channel state associated with a terminal is poor.

Accordingly, the wireless communication system provides a femto-cell service for providing a high-speed data service while addressing a service problem of a shadow area. The femto cell denotes a small cell area formed by a compact base station that is installed inside an office or a house and that accesses a mobile communication core network via a broadband network. The compact base station is a base station of small power directly installed by a user, and may be called a micro base station, a self configurable base station, an indoor base station, a home base station, a femto base station, and the like. In the following description, the compact base station is referred to as a femto enhanced Node B (eNB).

In a network where a macro eNB and a femto eNB are installed, when a center frequency of the macro eNB and a center frequency of the femto eNB are different from each other, there is a high possibility that a terminal may not recognize a signal of the femto eNB even when the terminal enters the region of the femto eNB. In this case, the terminal is not handed-in to the femto eNB while maintaining connection with the macro eNB.

To address this problem, in a case of a Code Division Multiple Access (CDMA) femto eNB, a method for transmitting a beacon signal for each Frequency Assignment (FA) has been suggested as a beaconing method for allowing a femto eNB to inform a terminal of existence of the femto eNB. That is, a CDMA femto eNB sets a CDMA frequency field cdma_frequency of a CDMA Channel List Message (CCLM) for each FA to an operation frequency and transmits the same. A terminal that receives this is synchronized with the CDMA frequency to perform a hand-in to the CDMA femto eNB.

However, the Long Term Evolution (LTE) and the CDMA are different not only in a transmission method in a physical layer but also in a message format used in an upper layer. Therefore, development of a method suitable for an LTE femto eNB is required.

A terminal may not recognize a signal of the femto eNB even when the terminal enters the coverage area of the femto eNB. Accordingly, a method for changing a System Information Block (SIB) message of a 3rd Generation Partnership Project (3GPP) LTE standard has been suggested. However, a method for changing an SIB message suggested by the LTE femto eNB does not conform to a current 3GPP standard, and thus a compatibility problem with a terminal occurs.

Therefore, a need exists for an apparatus and a method for allowing a terminal that has accessed an LTE macro eNB to efficiently perform a hand-in to an LTE femto eNB in a case where the terminal moves to a region of the LTE femto eNB while conforming to the LTE standard in a wireless communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for allowing a Long Term Evolution (LTE) femto enhanced Node B (eNB) to efficiently perform beaconing in a wireless communication system.

Another aspect of the present invention is to provide an apparatus and a method for allowing a terminal that has accessed an LTE macro eNB to efficiently perform a hand-in to an LTE femto eNB in a case where the terminal moves to a region of the LTE femto eNB while conforming to the LTE standard in a wireless communication system.

Yet another aspect of the present invention is to provide an apparatus and a method for efficiently performing beaconing by allowing an LTE femto eNB to update and transmit a System Information Block (SIB) 1 message, a SIB 5 message, and a paging message transmitted by an LTE macro eNB in a wireless communication system.

Still another aspect of the present invention is to provide an apparatus and a method for allowing an LTE femto eNB to obtain a SIB 5 message of an LTE macro eNB transmitted to a terminal by the LTE macro eNB, add information of the LTE femto eNB (for example, a center frequency, and a Physical Cell IDentifier (PCID)) to the obtained SIB 5 message of the LTE macro eNB to update the same, and transmit the updated SIB 5 message to the terminal in a wireless communication system.

Still another aspect of the present invention is to provide an apparatus and a method for obtaining a SIB 1 message of an LTE macro eNB transmitted to a terminal by the LTE macro eNB in order to allow an LTE femto eNB to inform an active terminal of update of a SIB 5 message, adding information indicating existence of the updated SIB message to the obtained SIB 1 message of the LTE macro eNB to update the same, and transmitting the updated SIB 1 message to the terminal in a wireless communication system.

Still another aspect of the present invention is to provide an apparatus and a method for adding information indicating existence of an updated SIB message to a paging message to update the same in order to allow an LTE femto eNB to inform an idle terminal of update of a SIB 5 message, and transmitting the updated paging message to the terminal in a wireless communication system.

In accordance with an aspect of the present invention, a method for allowing a femto base station to perform beaconing in a wireless communication system is provided. The method includes obtaining a SIB message of a neighbor macro base station transmitted to a terminal by the neighbor macro base station, adding information of the femto base station to the obtained SIB message of the macro base station to update the same, and transmitting the updated SIB message to the terminal.

In accordance with another aspect of the present invention, an apparatus for allowing a femto base station to perform beaconing in a wireless communication system is provided. The apparatus includes a reception modem for obtaining a SIB message of a neighbor macro base station transmitted to a terminal by the neighbor macro base station, a message generator for adding information of the femto base station to the obtained SIB message of the macro base station to update the same, and a transmission modem for transmitting the updated SIB message to the terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide an alternative for allowing a femto enhanced Node B (eNB) to efficiently perform beaconing in a wireless communication system.

According to exemplary embodiments of the present invention, it is assumed that a macro eNB and a femto eNB use different center frequencies, respectively, and the macro eNB does not recognize existence of the femto cell as a neighbor cell. On the above assumption, when the macro eNB transmits information (for example, a center frequency, a Physical Cell IDentifier (PCID), and the like) of neighbor eNBs through a System Information Block (SIB) 5 message to a terminal, information of the femto eNB is not included in the SIB 5 message transmitted by the macro eNB to the terminal. In this case, the terminal that has received the SIB 5 message may not recognize a signal of the femto eNB even when it moves to the region of the femto eNB, and accordingly, the terminal may not perform a hand-in to the femto eNB while maintaining connection with the macro eNB. To address this problem, an exemplary embodiment of the present invention proposes a method for allowing a femto eNB to obtain the SIB 5 message transmitted by the macro eNB to the terminal, add information of the femto eNB to the obtained SIB 5 message and update the same, and transmit the updated SIB 5 message to the terminal. In addition, an exemplary embodiment of the present invention proposes a method for allowing a femto eNB to obtain a SIB 1 message transmitted by the macro eNB to the terminal, add information indicating existence of an updated SIB message to the obtained SIB 1 message and update the same, and transmit the updated SIB 1 message to the terminal in order to inform an active terminal of the update of the SIB 5 message. Furthermore, an exemplary embodiment of the present invention proposes a method for allowing the femto eNB to add information indicating existence of an updated SIB message to a paging message and update the same, and transmit the updated paging message to a terminal in order to inform an idle terminal of the update of the SIB 5 message.

Though a wireless communication system according to an exemplary embodiment of the present invention is described using a 3rd Generation Partnership Project (3GPP) Long Term Evolution (LTE) system as an example, it is applicable to a different wireless communication system where a macro eNB and a femto eNB are installed.

FIGS. 1 through 6, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

Figure 1:
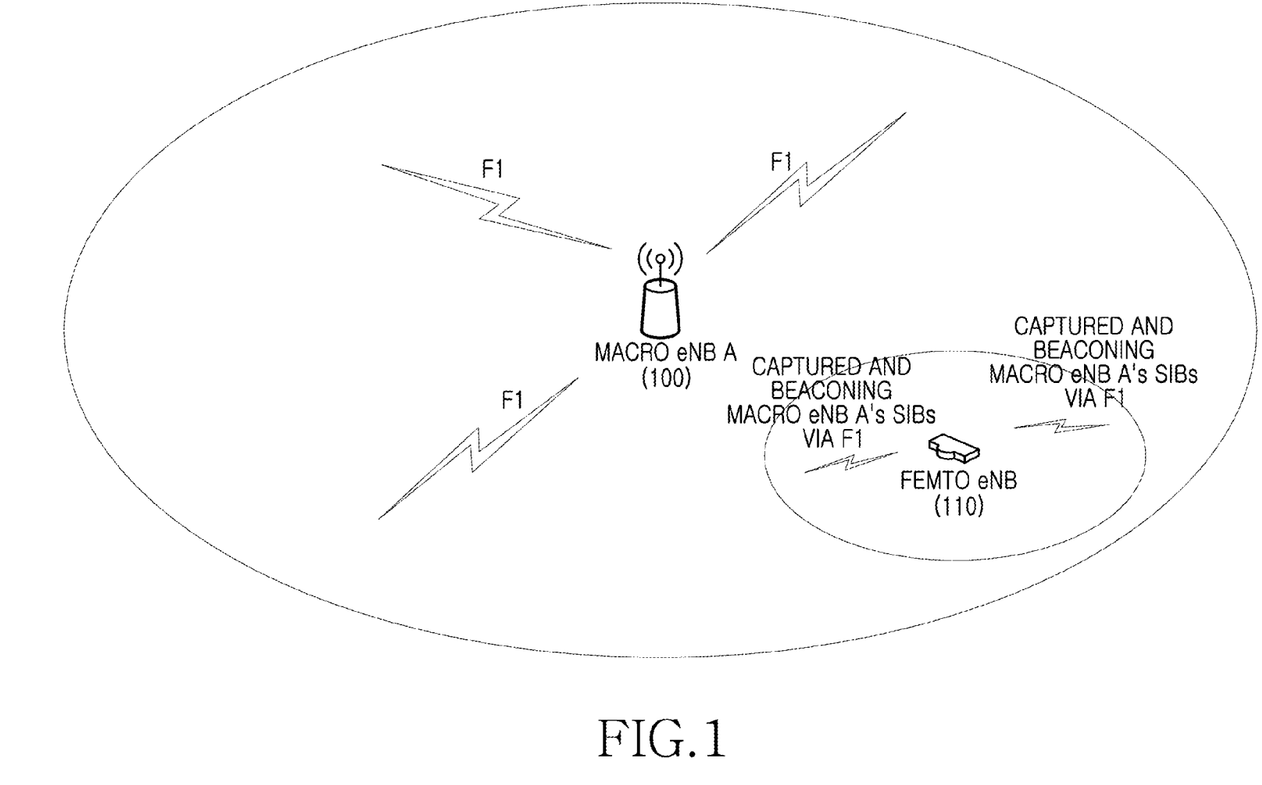
FIG. 1 illustrates a wireless communication system where one macro enhanced Node B (eNB) exists in a neighborhood of a femto eNB according to an exemplary embodiment of the present invention.

FIG. 1 illustrates a wireless communication system where one macro eNB exists in a neighborhood of a femto eNB according to an exemplary embodiment of the present invention.

Referring to FIG. 1, a wireless communication system includes a macro eNB A 100 and a femto eNB 110. Here, it is assumed that the femto eNB 110 is hierarchically subjected to the macro eNB A 100. In addition, it is assumed that the center frequency of the femto eNB 110 is different from that of the macro eNB A 100, and the macro eNB A 100 uses a center frequency F1.

In the wireless communication system where one macro eNB A 100 exists in the neighborhood of the femto eNB 110, the femto eNB 110 obtains a SIB 5 message of the macro eNB A 100 transmitted by the macro eNB A 100 to a terminal, adds information (for example, a center frequency, a PCID, and the like) of the femto eNB 110 to the obtained SIB 5 message of the macro eNB A 100 and updates the same, and transmits the updated SIB 5 message to the terminal Here, the femto eNB 110 transmits the updated SIB 5 message to the terminal according to scheduling information of the macro eNB A 100 using the center frequency F1 of the macro eNB A 100.

In addition, to inform an active terminal of existence of the updated SIB 5 message, the femto eNB 110 adds information indicating existence of the updated SIB message (that is, the SIB 5 message) to a SIB 1 message of the macro eNB A 100 transmitted by the macro eNB A 100 to a terminal, and updates the same, and transmits the updated SIB 1 message to the terminal. By doing so, the active terminal that has received the updated SIB 1 message may recognize that the updated SIB message (that is, the SIB 5 message) exists. Here, the femto eNB 110 transmits the updated SIB 1 message to the terminal according to scheduling information of the macro eNB A 100 using the center frequency F1 of the macro eNB A 100.

In addition, to inform an idle terminal of existence of the updated SIB 5 message, the femto eNB 110 periodically adds information indicating the existence of the updated SIB message (that is, the SIB 5 message) to a paging message and updates the same, and transmits the updated paging message to the terminal. By doing so, the idle terminal that has received the updated paging message may recognize that the updated SIB message (that is, the SIB 5 message) exists. Here, the femto eNB 110 transmits the updated paging message to the terminal according to scheduling information of the macro eNB A 100 using the center frequency F1 of the macro eNB A 100.

Figure 2:
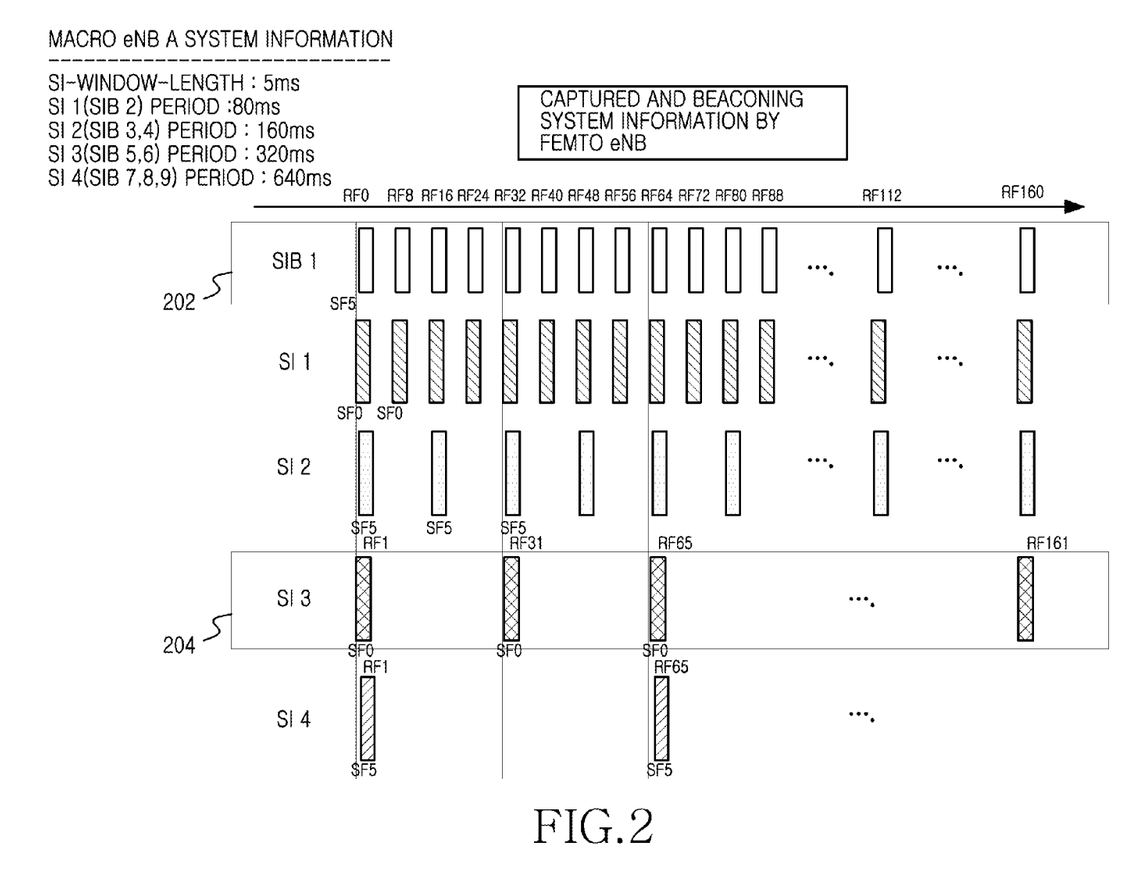
FIG. 2 illustrates a macro eNB transmitting a System Information Block (SIB) message in a wireless communication system where one macro eNB exists in a neighborhood of a femto eNB according to an exemplary embodiment of the present invention.

FIG. 2 illustrates a macro eNB transmitting an SIB message in a wireless communication system where one macro eNB exists in a neighborhood of a femto eNB according to an exemplary embodiment of the present invention.

Referring to FIG. 2, in a wireless communication system where one macro eNB A 100 exists in a neighborhood of a femto eNB 110, the macro eNB A 100 transmits a plurality of SIB messages to a terminal. For example, the macro eNB A 100 transmits a SIB 1 message through a SIB 9 message to a terminal. Of them, the SIB 1 message is transmitted at a predefined period, and the other SIB messages, SIB 2 message through SIB 9 message are classified into a predefined number (for example, 4) of SIB groups (referred to as a 'SI' hereinafter) and transmitted at a period determined for each group. As illustrated in FIG. 2, an SI 1 includes a SIB 2 message, an SI 2 includes a SIB 3 message and a SIB 4 message, an SI 3 includes a SIB 5 message and a SIB 6 message, and an SI 4 includes a SIB 7 message, a SIB 8 message and a SIB 9 message. In addition, periods of the SI 1, SI 2, SI 3, and SI 4 are determined as 80 ms, 160 ms, 320 ms, and 640 ms, respectively. Information regarding the construction and period for each SI is defined in the SIB 1 message.

When the macro eNB A 100 transmits a plurality of SIB messages to a terminal, the femto eNB 110 obtains an SI 3 204 including a SIB 1 message 202 and a SIB 5 message, updates the obtained SIB 1 message 202 and SIB 5 message, and transmits the SI 3 204 including the updated SIB 1 message 202 and the updated SIB 5 message to the terminal.

Figure 3:
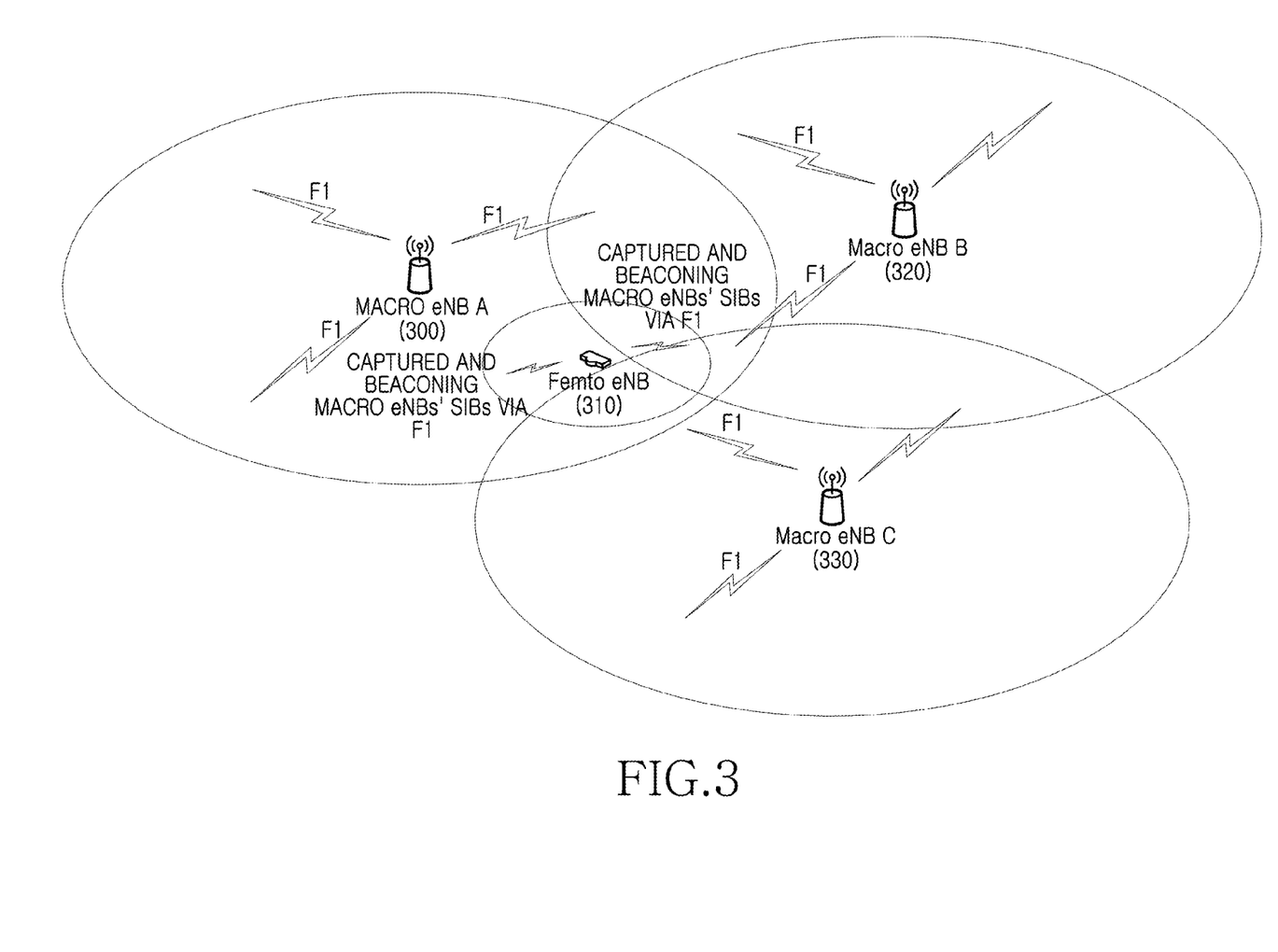
FIG. 3 illustrates a wireless communication system where a plurality of macro eNBs exists in a neighborhood of a femto eNB according to an exemplary embodiment of the present invention.

FIG. 3 illustrates a wireless communication system where a plurality of macro eNBs exists in a neighborhood of a femto eNB according to an exemplary embodiment of the present invention.

Referring to FIG. 3, a wireless communication system includes a macro eNB A 300, a femto eNB 310, a macro eNB B 320, and a macro eNB C 330. Here, it is assumed that the femto eNB 310 is hierarchically subjected to the macro eNB A 300. In addition, it is assumed that the center frequency of the femto eNB 310 is different from those of the macro eNB A 300, the macro eNB A 320, and the macro eNB C 330, and the macro eNB A 300, the macro eNB B 320, and the macro eNB C 330 use the center frequency F1.

In the wireless communication system where the plurality of macro eNBs 300, 320, and 330 exist in the neighborhood of the femto eNB 310, the femto eNB 310 obtains a SIB 5 message transmitted by the relevant macro eNBs 300, 320, and 330 to a terminal with respect to each of the macro eNBs 300, 320, and 330 existing in the neighborhood, adds information (for example, a center frequency, a PCID, and the like) of the femto eNB 310 to the obtained SIB 5 message and updates the same, and transmits the updated SIB 5 message to the terminal. Here, the femto eNB 310 transmits the updated SIB 5 message to the terminal according to scheduling information of the relevant macro eNBs 300, 320, and 330 using the center frequency F1 of the relevant macro eNBs 300, 320, and 330.

In addition, to inform an active terminal of existence of the updated SIB 5 message, the femto eNB 310 adds information indicating existence of the updated SIB message (that is, the SIB 5 message) to a SIB 1 message transmitted by the relevant macro eNBs 300, 320, and 330 to a terminal with respect to each of the macro eNBs 300, 320, and 330, and updates the same, and transmits the updated SIB 1 message to the terminal. By doing so, the active terminal that has received the updated SIB 1 message may recognize that the updated SIB message (that is, the SIB 5 message) exists. Here, the femto eNB 310 transmits the updated SIB 1 message to the terminal according to scheduling information of the relevant macro eNBs 300, 320, and 330 using the center frequency F1 of the macro eNBs 300, 320, and 330.

In addition, to inform an idle terminal of existence of the updated SIB 5 message, the femto eNB 310 periodically adds information indicating the existence of the updated SIB message (that is, the SIB 5 message) to a paging message and updates the same, and transmits the updated paging message to the terminal. By doing so, the idle terminal that has received the updated paging message may recognize that the updated SIB message (that is, the SIB 5 message) exists. Here, the femto eNB 310 transmits the updated paging message to the terminal according to scheduling information of the relevant macro eNBs 300, 320, and 330 using the center frequency F1 of the relevant macro eNBs 300, 320, and 330.

In a case where the plurality of macro eNBs 300, 320, and 330 existing in the neighborhood of the femto eNB 310 have a plurality of center frequencies, such as Center_Freq$_1$, Center_Freq$_2$, ..., Center_Freq$_n$, that is, the macro eNBs 300, 320, and 330 use different center frequencies, respectively, the femto eNB 310 performs time-sharing on Center_Freq$_1$, Center_Freq$_2$, ..., Center_Freq$_n$, to perform beaconing. That is, the femto eNB 310 controls time such that times do not overlap for each macro eNB to perform beaconing.

Figure 4:
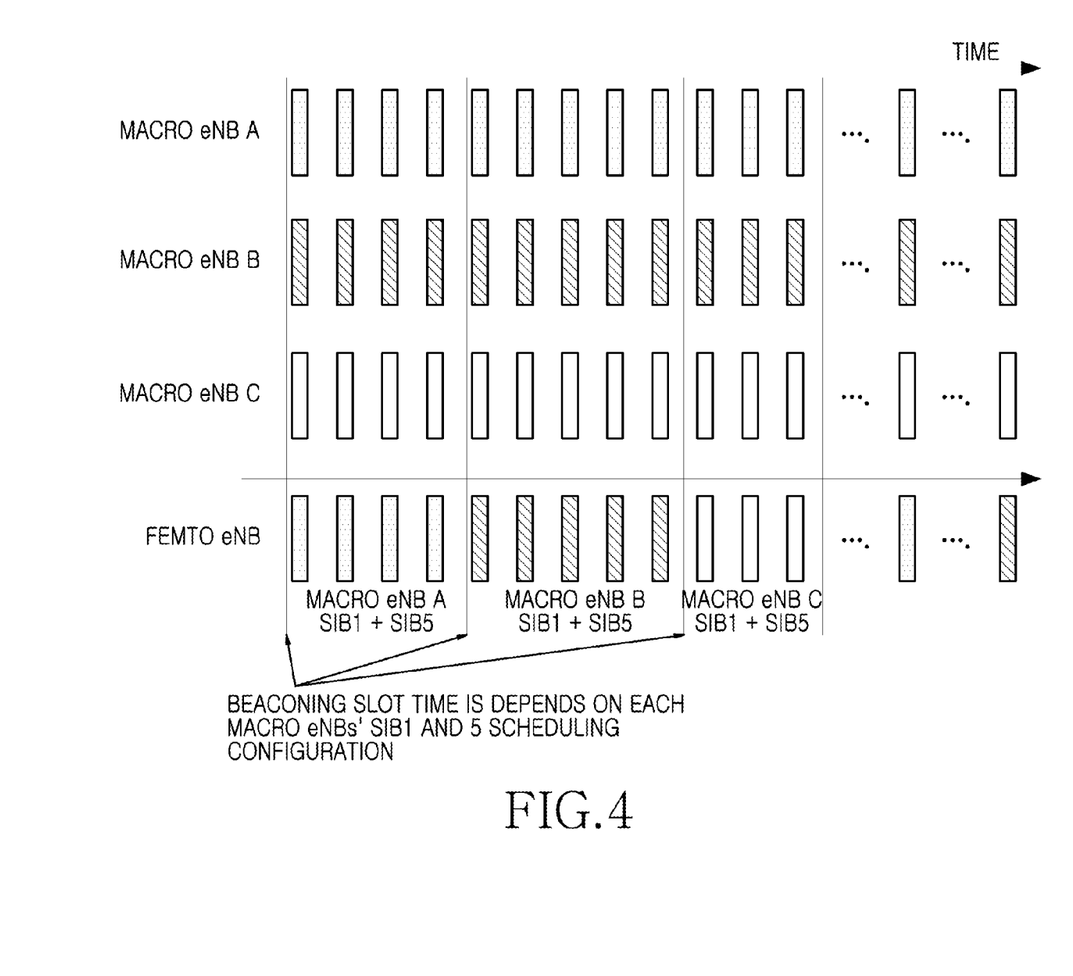
FIG. 4 illustrates a plurality of macro eNBs transmitting an SIB message in a wireless communication system where a plurality of macro eNBs exists in a neighborhood of a femto eNB according to an exemplary embodiment of the present invention.

FIG. 4 illustrates a plurality of macro eNBs transmitting an SIB message in a wireless communication system where a plurality of macro eNBs exists in a neighborhood of a femto eNB according to an exemplary embodiment of the present invention.

Referring to FIG. 4, in a wireless communication system where a macro eNB A 300, a macro eNB B 320, and a macro eNB C 330 exist in the neighborhood of a femto eNB 110, each of the plurality of macro eNBs 300, 320, and 330 existing in the neighborhood of the femto eNB 310 transmits a plurality of SIB messages to a terminal. Here, the construction of the plurality of SIB messages transmitted by the plurality of macro eNBs 300, 320, and 330 is the same as illustrated in FIG. 2.

When the plurality of macro eNBs 300, 320, and 330 transmit the plurality of SIB messages to the terminal, the femto eNB 310 controls a time such that times do not overlap for respective macro eNBs 300, 320, and 330 to obtain a SIB 1 message and a SIB 5 message for each macro eNBs 300, 320, and 330, updates the obtained SIB 1 message and SIB 5 message, and transmits the updated SIB 1 message and SIB 5 message to the terminal.

Figure 5:
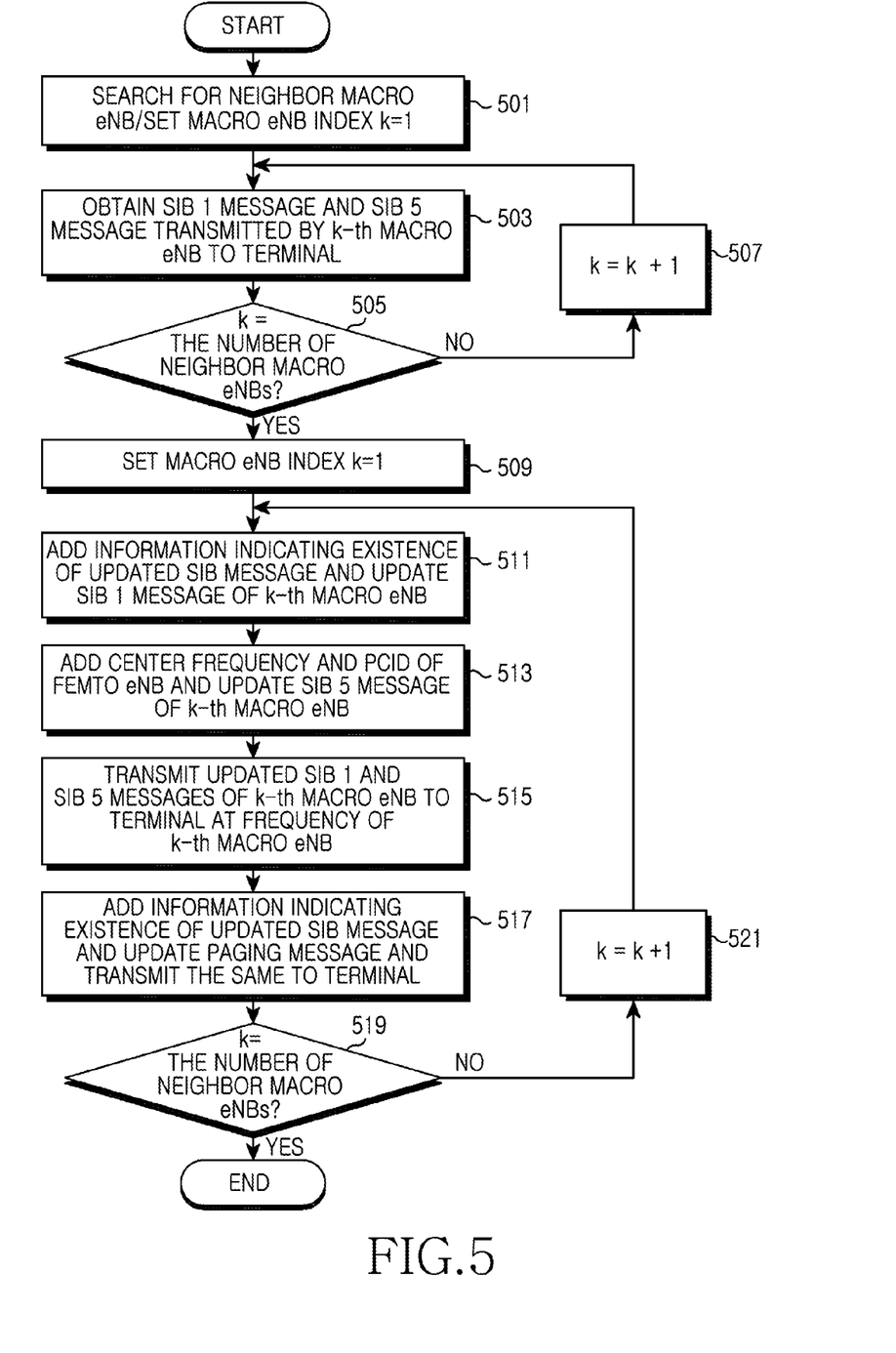
FIG. 5 illustrates a method for allowing a femto eNB to efficiently perform beaconing in a wireless communication system according to an exemplary embodiment of the present invention.

FIG. 5 illustrates a method for allowing a femto eNB to efficiently perform beaconing in a wireless communication system according to an exemplary embodiment of the present invention.

Referring to FIG. 5, in step 501, a femto eNB performs scanning to search for a neighbor macro eNB and set a macro eNB index k to 1.

In step 503, the femto eNB obtains a SIB 1 message and a SIB 5 message transmitted by a k-th macro eNB to a terminal.

In step 505, the femto eNB determines whether k is the same as the number of found neighbor macro eNBs.

If it is determined in step 505 that k is not the same as the number of the found neighbor macro eNBs, the femto eNB recognizes that it has not obtained SIB 1 messages and SIB 5 messages of all neighbor macro eNBs, and updates k to a number obtained by adding 1 to k in step 507, and returns to step 503 to perform subsequent steps.

In contrast, if it is determined in step 505 that k is the same as the number of the found neighbor macro eNBs, the femto eNB recognizes that it has obtained SIB 1 messages and SIB 5 messages of all neighbor macro eNBs, sets a macro eNB index k to 1 in step 509, and proceeds to step 511.

In step 511, the femto eNB adds information indicating existence of the updated SIB message (that is, the SIB 5 message) to a SIB 1 message of a k-th macro eNB to update the SIB 1 message. For example, the femto eNB indicates existence of the updated SIB message (that is, the SIB 5 message) by changing a value of a systemInfoValueTag field inside the SIB 1 message using Equation (1) below. An active terminal that has received the updated SIB 1 message may recognize that the updated SIB message (that is, the SIB 5 message) exists.

$$SystemInfoValueTag=(systemInfoValueTag+1) \bmod 32 \quad (1)$$

In step 513, the femto eNB adds the center frequency and the PCID of the femto eNB itself to update a SIB 5 message of the k-th macro eNB. For example, the femto eNB adds the center frequency of the femto eNB itself to an InterFreqCarrierFreq List field inside the SIB 5 message, and adds the PCID of the femto eNB itself to an InterFreqNeighCellInfo field inside the SIB 5 message.

In step 515, the femto eNB transmits the updated SIB 1 message and SIB 5 message of the k-th macro eNB to a terminal according to scheduling information of the k-th macro eNB using the frequency of the k-th macro eNB. For example, the femto eNB merges the updated SIB 5 message and SIB 6 message, and transmits the merged SIB message (that is, an SI 3) to the terminal together with the updated SIB 1 message.

In step 517, the femto eNB periodically adds information indicating existence of the updated SIB message (that is, the SIB 5 message) to a paging message to update the same and transmits the updated paging message to the terminal. For example, the femto eNB indicates existence of the updated SIB message (that is, the SIB 5 message) by setting a systemInfoModification field inside the paging message to 'true'. An idle terminal that has received the updated paging message may recognize that the updated SIB message (that is, the SIB 5 message) exists. Here, the femto eNB transmits the updated paging message to the terminal according to scheduling information of the k-th macro eNB using a frequency of the k-th macro eNB.

In step 519, the femto eNB determines whether k is the same as the number of the found neighbor macro eNBs.

If it is determined in step 519 that k is not the same as the number of the found neighbor macro eNBs, the femto eNB recognizes that it has not updated and transmitted SIB 1 messages and SIB 5 messages of all neighbor macro eNBs, and updates k to a number obtained by adding 1 to k in step 521, and returns to step 511 to perform subsequent steps.

In contrast, if it is determined in step 519 that k is the same as the number of the found neighbor macro eNBs, the femto eNB recognizes that it has updated and transmitted the SIB 1 messages and SIB 5 messages of all neighbor macro eNBs, and ends the algorithm.

Since the femto eNB indicates existence of an updated SIB message (that is, the SIB 5 message) using a SIB 1 message and a paging message, not only an active terminal but also an idle terminal may recognize that the SIB 5 message has been updated.

Figure 6:
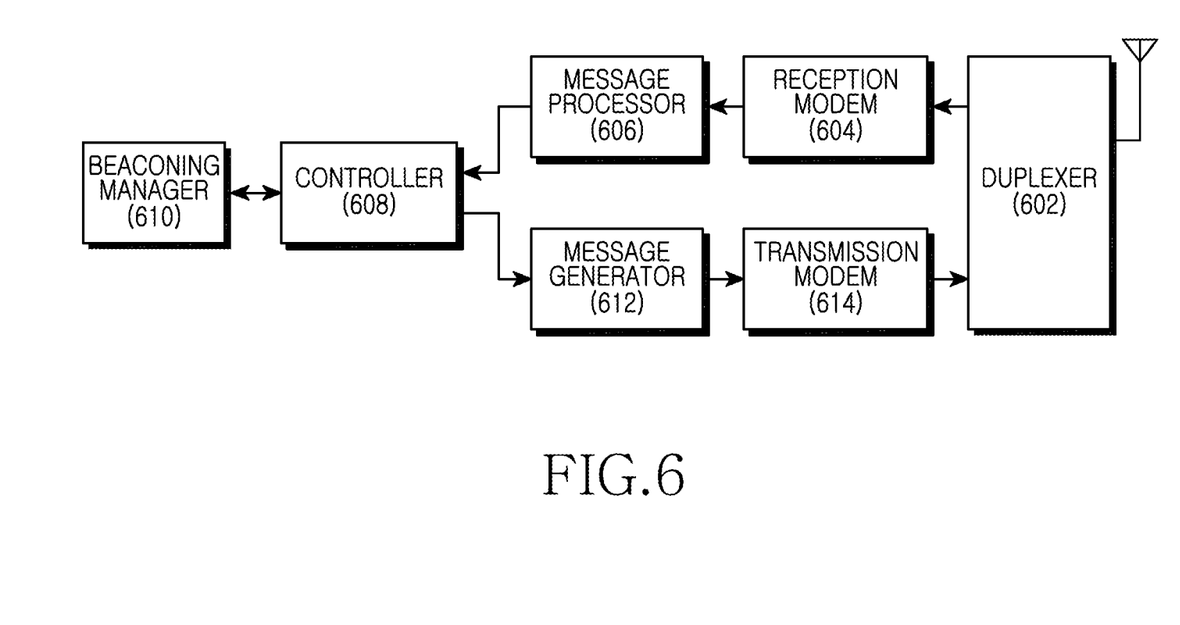
FIG. 6 is a block diagram illustrating a femto eNB according to an exemplary embodiment of the present invention.

FIG. 6 is a block diagram illustrating a femto eNB according to an exemplary embodiment of the present invention.

Referring to FIG. 6, a femto eNB includes a duplexer 602, a reception modem 604, a message processor 606, a controller 608, a beaconing manager 610, a message generator 612, and a transmission modem 614.

The duplexer 602 transmits a transmission signal provided from the transmission modem 614 via an antenna, and provides a reception signal from the antenna to the reception modem 604 according to a duplexing scheme.

The reception modem 604 recovers data from a signal provided from the duplexer 602 to transfer the same to the message processor 606. For example, the reception modem 604 includes a Radio Frequency (RF) reception block, a demodulation block, a channel decoding block, etc. At this point, the RF reception block includes a filter and an RF pre-processor. In a case where a wireless communication system uses an Orthogonal Frequency Division Multiplexing (OFDM) scheme, the demodulation block includes a Fast Fourier Transform (FFT) operator for extracting data conveyed on each carrier. The channel decoding block includes a demodulator, a deinterleaver, and a channel decoder.

The message processor 606 processes a message or reception data provided from the reception modem 604 to provide the processed result to the controller 608. More particularly, the message processor 606 provides a SIB 1 message and a SIB 5 message transmitted by at least one neighbor macro eNB to a terminal to the controller 608.

The controller 608 controls an overall transmission/reception operation of the femto eNB. More particularly, the controller 608 controls an overall operation for performing an efficient beaconing based on a SIB 1 message and a SIB 5 message for each macro eNB provided from the message processor 606, and information (for example, a center frequency, a PCID, and the like) of a femto eNB provided from the beaconing manager 610. That is, the controller 608 controls the message generator 612 to add information (for example, a center frequency, a PCID, and the like) of a femto eNB to the SIB 5 message for each macro eNB and update the same, and controls the transmission modem 614 to transmit the updated SIB 5 message for each macro eNB to a terminal. In addition, the controller 608 controls the message generator 612 to add information indicating existence of the updated SIB message (that is, the SIB 5 message) to the SIB 1 message for each macro eNB and update the same, and controls the transmission modem 614 to transmit the updated SIB 1 message for each macro eNB to a terminal. In addition, the controller 608 controls the message generator 612 to generate a paging message including information indicating existence of the updated SIB message (that is, the SIB 5 message), and controls the transmission modem 614 to transmit the generated paging message to a terminal. In a case where a plurality of neighbor macro eNBs exists, the controller 608 controls the beaconing by performing time-sharing on the plurality of macro eNBs.

The beaconing manager 610 manages information (for example, a center frequency, a PCID, and the like) of a femto eNB to be used for beaconing.

The message generator 612 generates a message or transmission data to be transmitted under control of the controller 608 to provide the same to the transmission modem 614. More particularly, the message generator 612 updates a SIB 1 message and a SIB 5 message for each macro eNB to provide the same to the transmission modem 614.

The transmission modem 614 converts a message or transmission data provided from the message generator 612 into a form for transmission via a radio resource and provides the same to the duplexer 602. For example, the transmission modem 614 includes a channel coding block, a modulation block, and an RF transmission block. At this point, the channel coding block includes a modulator, an interleaver, and a channel encoder. In a case where a wireless communication system uses an OFDM scheme, the modulation block includes an Inverse Fast Fourier Transform (IFFT) operator for mapping data to each subcarrier. The RF transmission block includes a filter and an RF pre-processor.

In the above construction, the controller 608 controls the message processor 606, the beaconing manager 610, and the message generator 612. That is, the controller 608 may perform the functions of the message processor 606, the beaconing manager 610, and the message generator 612.

As described above, an exemplary embodiment of the present invention provides a method for allowing an LTE femto eNB in a wireless communication system to obtain a SIB 5 message of an LTE macro eNB transmitted by the LTE macro eNB to a terminal, add information (for example, a center frequency, a PCID, and the like) of the LTE femto eNB to the SIB 5 message of the obtained LTE macro eNB and update the same, and transmit the updated SIB 5 message to the terminal. In addition, an exemplary embodiment of the present invention provides a method for adding information indicating existence of an updated SIB message (that is, a SIB 5 message) to a SIB 1 message of an LTE macro eNB transmitted by the LTE macro eNB to a terminal and updating the same, and transmitting the updated SIB 1 message to the terminal in order to allow the LTE femto eNB to inform the terminal of existence of the updated SIB 5 message. In addition, as an alternative for informing a terminal of existence of the updated SIB 5 message, an exemplary embodiment of the present invention provides a method for allowing an LTE femto eNB to generate a paging message including information indicating existence of the updated SIB message (that is, the SIB 5 message), and transmitting the paging message to the terminal. Therefore, in a case where a terminal that is connected to an LTE macro eNB moves to the region of an LTE femto eNB, the terminal may efficiently perform a hand-in to the LTE femto eNB while conforming to an LTE standard.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for allowing a femto base station to perform beaconing in a wireless communication system, the method comprising:
   obtaining a System Information Block (SIB) message of a neighbor macro base station transmitted to a terminal by the neighbor macro base station;
   adding information of the femto base station to the obtained SIB message of the macro base station and updating the same;
   transmitting the updated SIB message to the terminal;
   adding information indicating existence of the updated SIB message to an indication message; and
   transmitting the indication message to the terminal,
   wherein the obtained SIB message comprises a SIB 5 message, and
   wherein the adding of information indicating existence of the updated SIB message to the indication message comprises:
   obtaining a SIB 1 message of the macro base station transmitted by the macro base station to the terminal; and adding information indicating existence of the updated SIB 5 message to the obtained SIB 1 message of the macro base station as the indication message and updating the same, wherein the transmitting of the indication message to the terminal comprises transmitting the updated SIB 1 message as the indication message to the terminal.

2. The method of claim 1, wherein the wireless communication system comprises a Long Term Evolution (LTE) system.

3. The method of claim 1, wherein the information of the femto base station comprises at least one of a center frequency of the femto base station and a Physical Cell IDentifier (PCID) of the femto base station.

4. The method of claim 1, wherein the SIB message is transmitted to the terminal according to scheduling information of the macro base station at a frequency of the macro base station.

5. The method of claim 1, wherein the adding of information indicating existence of the updated SIB message to the indication message further comprises:

adding information indicating existence of the updated SIB 5 message to a paging message as the indication message and updating the same; and wherein the transmitting of the indication message to the terminal comprises transmitting the updated paging message as the indication message to the terminal.

6. The method of claim 1, further comprising:
searching for a neighbor macro base station; and
when a plurality of macro base stations are found, performing time-sharing on the plurality of found macro base stations.

7. The method of claim 1, wherein the femto base station uses a center frequency different from a center frequency of the macro base station.

8. An apparatus for allowing a femto base station to perform beaconing in a wireless communication system, the apparatus comprising:

a reception modem configured to obtain a System Information Block (SIB) message of a neighbor macro base station transmitted to a terminal by the neighbor macro base station;

a message generator configured to add information of the femto base station to the obtained SIB message of the macro base station and update the same; and a transmission modem configured to transmit the updated SIB message to the terminal, wherein the message generator is further configured to add information indicating existence of the updated SIB message to an indication message, wherein the transmission modem is further configured to transmit the indication message to the terminal, wherein the obtained SIB message comprises a SIB 5 message, wherein the reception modem is further configured to obtain a SIB 1 message of the macro base station transmitted by the macro base station to the terminal, wherein the message generator is further configured to add information indicating existence of the updated SIB 5 message to the obtained SIB 1 message of the macro base station as the indication message and update the same, and wherein the transmission modem is further configured to transmit the updated SIB 1 message as the indication message to the terminal.

9. The apparatus of claim 8, wherein the wireless communication system comprises a Long Term Evolution (LTE) system.

10. The apparatus of claim 8, wherein the information of the femto base station comprises at least one of a center frequency of the femto base station and a Physical Cell IDentifier (PCID) of the femto base station.

11. The apparatus of claim 8, wherein the SIB message is transmitted to the terminal according to scheduling information of the macro base station at a frequency of the macro base station.

12. The apparatus of claim 8, wherein the message generator is further configured to add information indicating existence of the updated SIB 5 message to a paging message as the indication message and update the same, and wherein the transmission modem is further configured to transmit the updated paging message as the indication message to the terminal.

13. The apparatus of claim 8, further comprising a controller configured to search for a neighbor macro base station, and, when a plurality of macro base stations are found, configured to perform time-sharing on the plurality of found macro base stations.

14. The apparatus of claim 8, wherein the femto base station is configured to use a center frequency different from a center frequency of the macro base station.

* * * * *